UNITED STATES PATENT OFFICE.

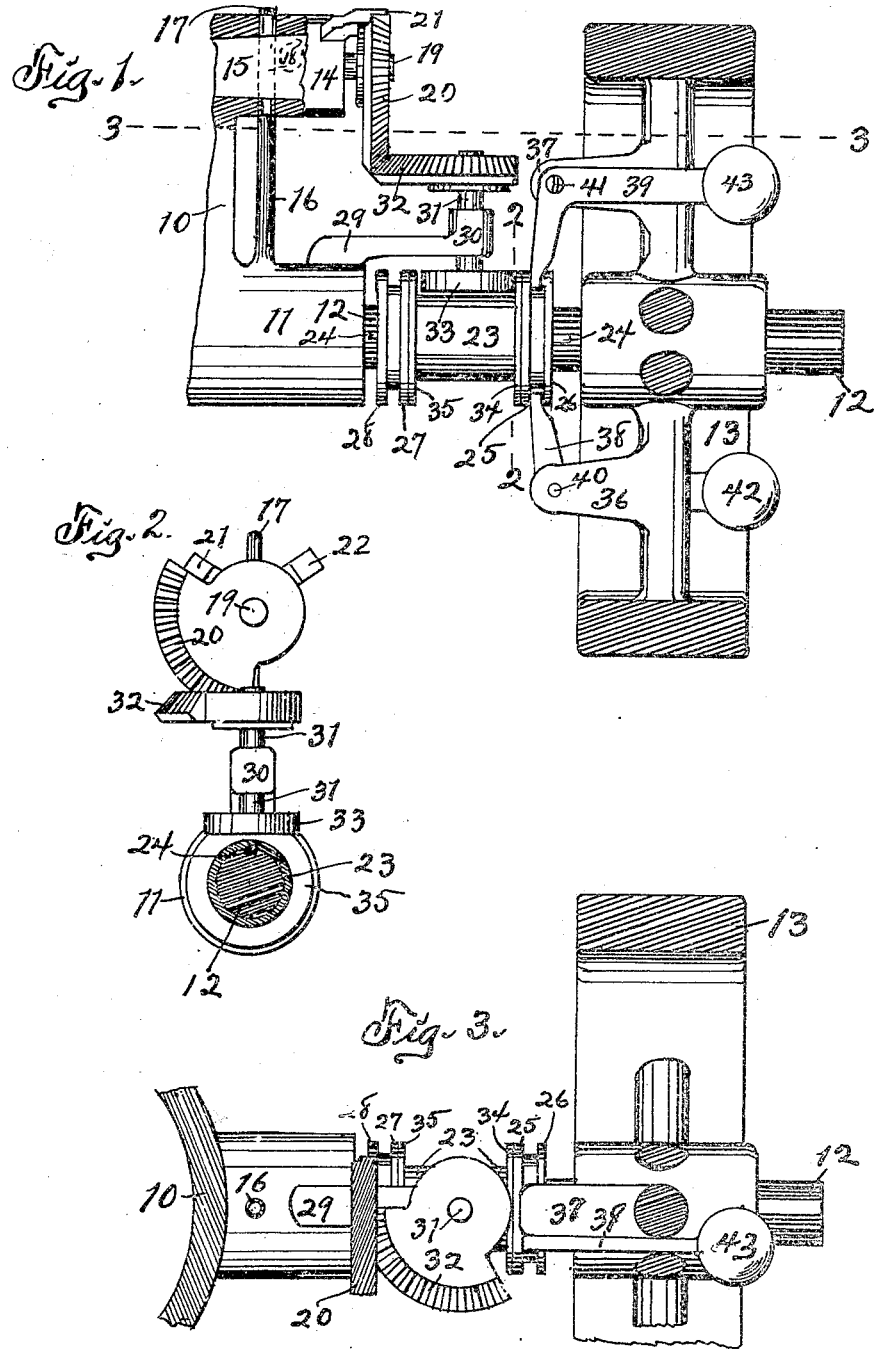

ROBERT B. BALLARD, OF FORT DODGE, IOWA.

GOVERNOR FOR EXPLOSIVE-ENGINES.

1,060,882.   Specification of Letters Patent.   Patented May 6, 1913.

Application filed September 13, 1911. Serial No. 649,172.

*To all whom it may concern:*

Be it known that I, ROBERT B. BALLARD, citizen of the United States of America, and resident of Fort Dodge, Webster county, Iowa, have invented a new and useful Governor for Explosive-Engines, of which the following is a specification.

The object of this invention is to provide an improved construction for governors for explosive engines.

A further object of this invention is to provide improved means adapted to be operated by centrifugal force, for shutting off the supply of explosive mixture from the cylinder of an internal combustion engine when the speed thereof rises above the normal.

A further object of this invention is to provide improved means for automatically controlling and regulating the supply of gas to an explosive engine.

My invention consists in the construction, arrangement and combination of elements hereinafter set forth, pointed out in my claims and illustrated by the accompanying drawing, in which—

Figure 1 is a side elevation, partly in section, of a portion of a gas engine. Fig. 2 is a sectional elevation on the indicated line 2—2 of Fig. 1. Fig. 3 is a plan, partly in section on the indicated line 3—3 of Fig. 1.

In the construction of the device as shown the numeral 10 designates a portion of the cylinder, 11 the crank case, 12 the shaft and 13 the balance wheel of an internal combustion engine, all of which elements are common and well known and are shown here as a foundation for my improvement.

The numeral 14 designates a valve chamber in which a tapered valve plug 15 is mounted for rotary oscillation. A pipe 16 communicates at one end with the crank case 11 and at the other end with the valve chamber 14 and a pipe 17 leads from the valve chamber to the cylinder 10. The valve plug 15 is adapted at times to cut off the communication between the pipes 16 and 17 through the valve chamber 14 and is formed with a transverse port 18 adapted to register at times with said pipes and to form a passageway through said plug and connection between said pipes. A shaft 19 is fixed to and projects from the valve plug 15 outsid the chamber 14 and a mutilated bevel gear 20 is fixed to the outer end portion of said shaft. Spaced stops 21, 22 are fixed to and project from the outer end of the valve chamber 14 and are adapted successively to engage shoulders of the mutilated gear 20 and prevent rotation thereof through more than one-third of a revolution in either direction. A shifting sleeve 23 is mounted on the shaft 12 between the crank case 11 and balance wheel 13. The sleeve 23 is free to move longitudinally of the shaft 12 and is connected to said shaft for rotation by means of a spline 24. The sleeve 23 is formed with spaced peripheral flanges 25, 26 at its end nearest the balance wheel and with similar flanges 27, 28 at its end nearest the crank case. A bracket 29 is formed on and projects from the top of the crank case 11 and is formed with a vertical bearing 30 in its outer end, which bearing is spaced above the central portion of the sleeve 23. A short shaft 31 is journaled in the bearing 30 and a bevel gear 32 (which may be mutilated as shown) is fixed to the upper end of said shaft and meshes with the bevel gear 20. The shaft 31 carries a friction wheel 33 on its lower end and said wheel is of a diameter slightly less than the distance between the intermediate flanges 25, 27 and is received between and adapted to contact successively with and be driven in opposite directions by said flanges. The friction wheel 33 preferably is made of hardened steel to prevent undue wear on its periphery. Annular rings 34, 35, preferably of leather, may be mounted on the inner faces of the flanges 25, 27 to receive the direct contact of the periphery of the friction wheel 33. Ears 36, 37 are formed on and project axially of diametrically opposite spokes of the balance wheel 13 and bell-crank levers 38, 39 are fulcrumed to said ears on screws 40, 41 respectively. The short arms of the bell-crank levers 38, 39 extend toward the shaft 12 and are received loosely within the annular groove between the flanges 25, 26. The long arms of the bell-crank levers 38, 39 are parallel with and spaced from the shaft 12 and carry governor-balls 42, 43 on their respective ends.

In practical use of this device and while the engine is running at or below normal speed, the parts are in the positions shown in the drawing and the port 18 of the valve plug 15 is in registration with the pipes 16, 17 and provides a passage for explosive mixture from the crank case 11 through said pipes to the cylinder 10. When the engine attains a speed greater than its normal the centrifugal force is sufficient to cause the governor-balls 42, 43 to fly outwardly from the shaft 12. This moves the short arms of the bell-crank levers 38, 39 toward the balance wheel 13, and said bell-cranks move with them the shifting sleeve 23 because of the engagement of their ends between the flanges 25, 26. This movement of the sleeve 23 brings the flange 35 into contact with a point on the inner periphery of the friction wheel 33 to the end of rotating clockwise said wheel and the shaft 31 and bevel gear 32. This has the effect of rotating the bevel gear 20, shaft 19 and valve plug 15 until a shoulder of said gear is brought into engagement with the stop 22, after which the flange 27 will slidingly engage but will not move the friction wheel 33. The rotation of the valve plug 15 has the effect of destroying the registering relation of the port 18 to the mouths of the pipes 16 and 17. The supply of explosive mixture to the cylinder is thus cut off and the engine misfires for one or more revolutions. When this condition has reduced the speed of the engine below its normal the centrifugal force on the governor-balls 42, 43 is decreased to such extent that said balls resume their normal positions as shown nearer to the shaft 12. This moves the bell-crank levers 38, 39 back and shifts the sleeve 23 again toward the crank case 11. In this position the flange 25 is brought into contact with the friction wheel 33 and said wheel and the shaft 31 and bevel gear 32 are rotated counter-clockwise. Such movement rotates the bevel gear 20 and shaft 19 and turns the valve plug 15 to a position where the port 18 registers with and forms a continuation of the pipes 16, 17. Such position of the valve plug is determined and rotation of the bevel gear 20 stopped by engagement of a shoulder of said gear with the stop 21, after which the flange 25 slidingly engages but does not move the friction wheel 33. This operation is continued and successive shifting of the sleeve 33 in opposite directions has the effect of opening and closing the valve and automatically regulating the supply of explosive mixture in the cylinder to keep the speed of the engine always near the normal.

When the sleeve 23 is mounted on the shaft 12 as shown the flange 28 performs no useful function; but I prefer to make both ends of said sleeve alike in order that said sleeve may be placed on the shaft either end first or may be changed end for end when desired, in which case the flange 28 would perform the function of the flange 26 as described.

I claim as my invention—

1. In a governor for explosive engines, a friction wheel adapted to be driven successively in opposite directions, a valve mounted for rotary oscillation, stops limiting oscillation of said valve in either direction, and mutilated gear connections between said friction wheel and rotary valve.

2. In an explosive engine having a crank case, cylinder, shaft and gas communication between said crank case and cylinder, the combination of a sleeve feathered to said shaft, centrifugal devices mounted on said shaft and adapted to shift said sleeve, a valve mounted in and controlling said gas communication, a friction wheel adapted to be driven successively in opposite directions by said sleeve, and mutilated gear operating connections between said friction wheel and valve.

3. In an explosive engine having a crank case, cylinder, shaft and gas communication between said crank case and cylinder, the combination of a flanged sleeve feathered to said shaft, centrifugal devices mounted on said shaft and adapted to shift said sleeve, a rotary valve mounted in and controlling said gas communication, a friction wheel adapted to be oscillated by the flanges of said sleeve, mutilated gear connections between said friction wheel and rotary valve, and stops limiting rotation of said valve in each direction.

4. In an explosive engine having a crank case, cylinder, shaft and gas communication between said crank case and cylinder, the combination of a rotary valve mounted in and controlling said gas communication, a bevel gear fixed to said valve, a driven friction wheel, a bevel gear fixed to said friction wheel and meshing with said first bevel gear, and stops limiting rotation of said valve in each direction.

5. In an explosive engine having a crank case, cylinder, shaft, balance wheel and gas communication between said crank case and cylinder, a friction wheel adapted to be driven alternately in opposite directions, a rotary valve in and controlling said gas communication, and mutilated bevel gear connections between said friction wheel and rotary valve.

6. In an explosive engine having a crank case, cylinder, and valve-controlled gas communication between said crank case and cylinder, a friction wheel adapted to be driven alternately in opposite directions, and mutilated bevel gear connections between said friction wheel and valve.

Signed by me at Fort Dodge, Iowa, this 29″ day of May, 1911.

ROBERT B. BALLARD.

Witnesses:
   JAMES B. COLLISON,
   A. G. BIRUZ.